(12) United States Patent
Pope et al.

(10) Patent No.: US 8,019,813 B2
(45) Date of Patent: Sep. 13, 2011

(54) SYNCHRONIZING SELF-REFERENCING FIELDS DURING TWO-WAY SYNCHRONIZATION

(75) Inventors: Alexander Joseph Pope, Seattle, WA (US); Roberto Reif, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 12/464,257

(22) Filed: May 12, 2009

(65) Prior Publication Data

US 2010/0293222 A1    Nov. 18, 2010

(51) Int. Cl.
G06F 15/16    (2006.01)
(52) U.S. Cl. ........................ 709/203; 709/219
(58) Field of Classification Search .......... 709/203, 709/219
See application file for complete search history.

(56) References Cited

U.S. PATENT DOCUMENTS

| | | | |
|---|---|---|---|
| 6,792,085 B1 | 9/2004 | Rigaldies et al. | 379/88.13 |
| 7,007,003 B1 | 2/2006 | Rybicki | 707/613 |
| 7,130,885 B2* | 10/2006 | Chandra et al. | 709/206 |
| 7,383,393 B2* | 6/2008 | Al Sukhni et al. | 711/137 |
| 7,496,886 B2* | 2/2009 | Puttaswamy et al. | 717/101 |
| 7,730,014 B2* | 6/2010 | Hartenstein et al. | 707/713 |
| 2002/0087556 A1 | 7/2002 | Hansmann et al. | 1/1 |
| 2006/0242204 A1 | 10/2006 | Karas et al. | 1/1 |
| 2008/0098042 A1 | 4/2008 | Tian et al. | 707/201 |
| 2008/0176536 A1 | 7/2008 | Galluzzo et al. | 455/414.1 |
| 2009/0055553 A1 | 2/2009 | Chasman et al. | 709/248 |
| 2010/0100463 A1* | 4/2010 | Molotsi et al. | 705/32 |

OTHER PUBLICATIONS

Microsoft; "*Synchronization Service and Synchronization Proxy Architecture*"; http://technet.microsoft.com/en-us/library/dd309600.aspx; pp. 1-2; 2009.
Usov; "*AllwaySync Makes Two-Way Synchronization Brainlessly Simple*"; http://www.free-press-release.com/news/200712/1197128701.html; pp. 1-2; Dec. 8, 2007.
Xephon plc; "*DB2 Update*"; http://www.cbttape.org/xephon/xephond/db20212.pdf; pp. 1-51; Dec. 2002.
Flexense Computing Systems Ltd.; "*Flexense: Advanced File Management Tools*"; http://www.flexense.com/flextk/; 2 pgs; 2009.
Bruni, et al.; "*DB2 for z/OS and OS/390 Version 7 Performance Topics*"; http://www.redbooks.ibm.com/redbooks/pdfs/sg246129.pdf; 268 Pgs.; Jul. 2001.
Primosync; "*Primosync*"; http://code.google.com/p/primosync/; 1 Pg.; 2008.
International Search Report mailed Nov. 30, 2010, issued in PCT/US2010/034279.

* cited by examiner

Primary Examiner — Kristie D Shingles
(74) Attorney, Agent, or Firm — Merchant & Gould

(57) ABSTRACT

Self-referencing fields are synchronized during a synchronization pass of a two-way synchronization between a client computer and a server computer. When a synchronization operation is performed, a list of server tasks associated with the server and a list of project tasks associated with the client are loaded. For each task being synchronized two predecessor lists are maintained. During the synchronization, a comparison is conducted to determine whether to use the project task data or the server task data. When the project task data is used, then the predecessor IDs stored in the project predecessor list are used. When the server task data is used, then the predecessor IDs stored in the server predecessor list are used.

20 Claims, 8 Drawing Sheets

SYNCHRONIZING SELF-REFERENCING FIELDS DURING TWO-WAY SYNCHRONIZATION

BACKGROUND

Task management application software gives users the ability to manage projects in an efficient and effective manner. A project manager can organize a project into tasks, assign tasks to specific users and allocate resources for tasks. Tasks management software can control the flow of work, link interrelated tasks and help ensure that project deadlines are met.

Task management information can be stored on two or more computer systems that share interrelated data. When these systems permit updates to the same data, conflicts may arise, especially when the interrelated data contains serially related tasks. For example, if a user on one system changes the start date for a task, the start and completion dates for interrelated tasks may also change.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Self-referencing fields are synchronized during a synchronization pass of a two-way synchronization between a client computer and a server computer. When a synchronization operation is performed, a list of collaboration tasks associated with a project on the server and a list of project tasks associated with the project on the client are loaded. For each task being synchronized, two lists are maintained including a project predecessor list and a collaboration predecessor list. During the synchronization, a comparison is conducted for each task to determine whether to use the project task data or the collaboration task data. When the project task data is used then the collaboration predecessor list is cleared and the project predecessor list is populated with the corresponding project predecessor IDs. When the collaboration task data is used then the project predecessor list is cleared and the collaboration predecessor list is populated with the corresponding collaboration predecessor IDs. During the write phase of the synchronization, the project predecessor list and the collaboration predecessor list are used to determine what predecessor IDs to write. When a project task is being written and the project predecessor list is not empty, then the project predecessor list is used. When the project predecessor list is empty and the collaboration predecessor list is not empty then the collaboration predecessor IDs are used.

DETAILED DESCRIPTION

Figure 1:
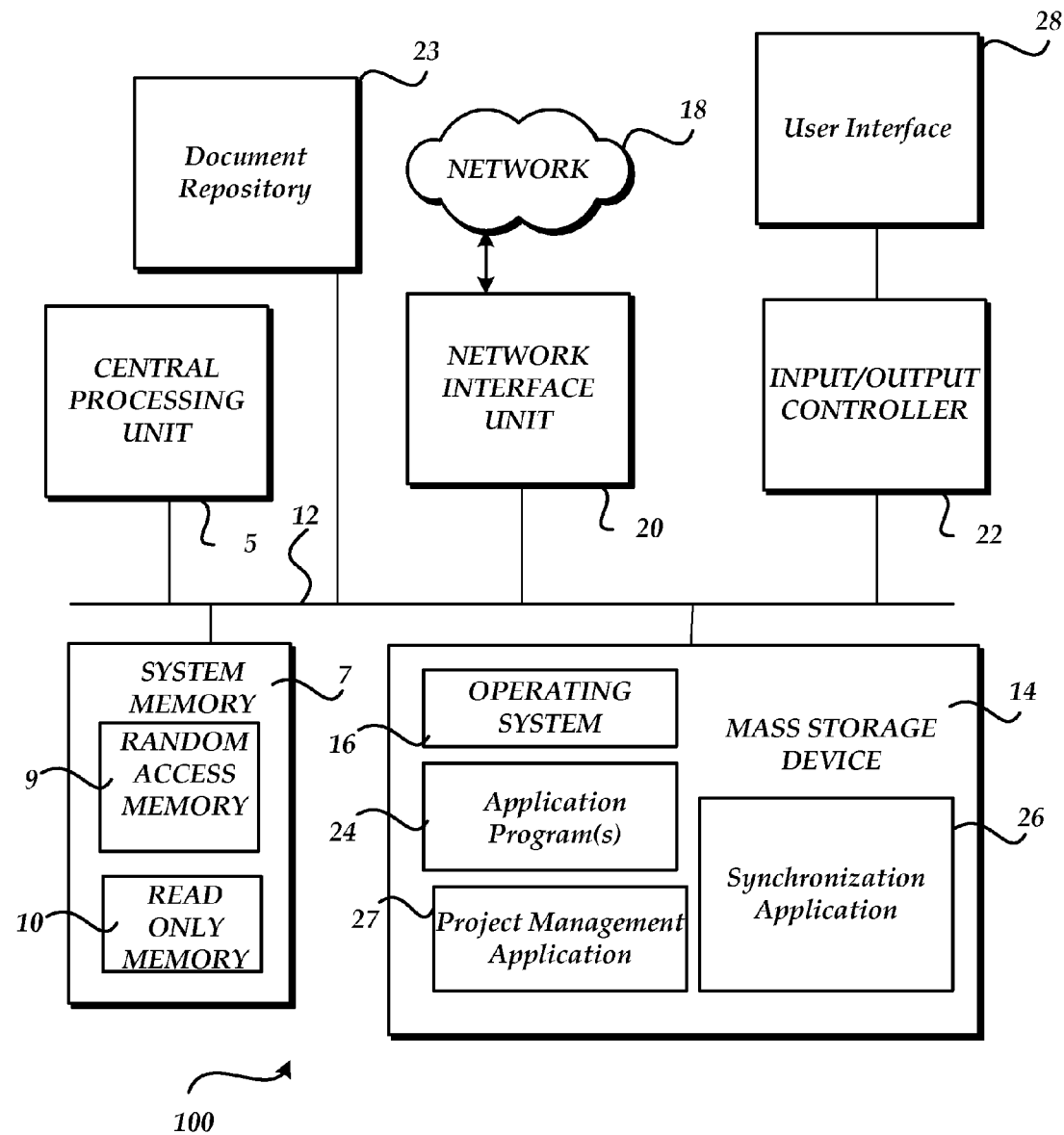
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS VISTA® operating system from MICROSOFT CORPORATION of Redmond, Wash. The mass storage device 14 and RAM 9 may also store one or more program modules. In particular, the mass storage device 14 and the RAM 9 may store one or more application programs 24. One of the application programs may be a project management application 27, such as MICROSOFT PROJECT®. When configured as a server, one of the application programs may be a collaboration program, such as WINDOWS SHAREPOINT SERVICES (WSS).

User interface (UI) 28 is designed to provide a user with a visual way to interact with project management application 27, collaboration application maintained on a server, as well as other application programs. For example, UI 28 may be used to display a list of tasks from which the user may select to edit. UI 28 may also be used to add or change the priority of a task.

Synchronization application 26 is configured to perform synchronization operations including synchronizing self-referencing fields between a client computing device running a project management application and a server computing device running a collaboration application.

Figure 2:
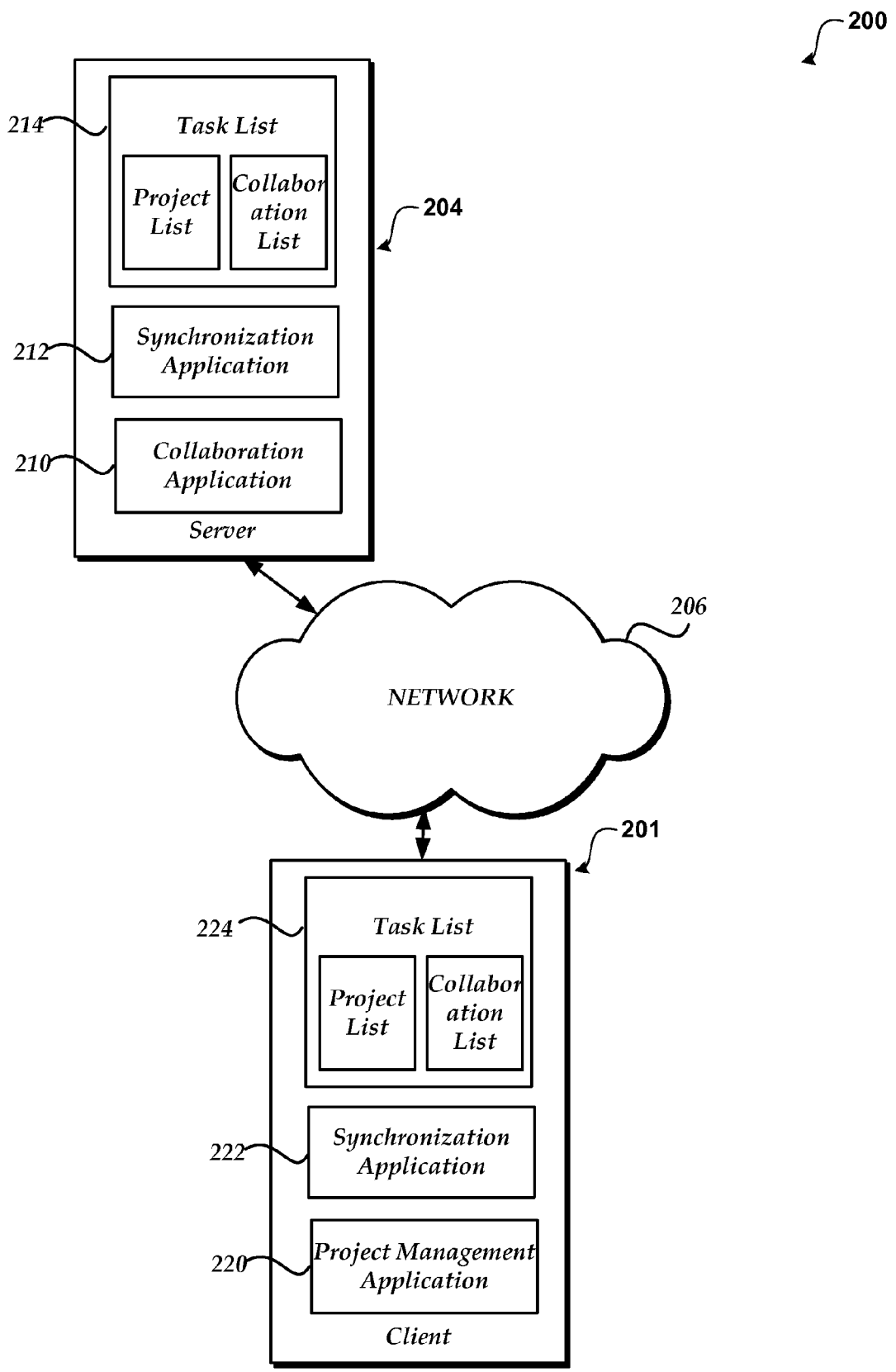
FIG. 2 shows an example synchronization system for synchronizing self-referencing fields.

FIG. 2 shows an example synchronization system 200 for synchronizing self-referencing fields. As illustrated, system 200 includes client 201, server 204 and network 206. While only one client and server are illustrated, system 200 may include more clients and/or servers.

Typically, one client computer, for example client computer 201, runs a project management application software program 220 in which projects are organized into interrelated tasks. An example project management system that runs task management application software is Microsoft Project 2007 from Microsoft Corporation of Redmond, Wash. Typically, the server computer 204 runs a collaboration and document-management software program 210 such as Windows Sharepoint Services (WSS), also from Microsoft Corporation. Example client 201 may use web services and/or a web browser across network 206 to access project management task lists stored via the collaboration application on server 204.

An example task management application may contain many interrelated tasks. One or more tasks may include dependencies on predecessor tasks. For example, task B may not be permitted to start until task A is completed. As such, task A is a predecessor to task B. Similarly, task E may not be permitted to start until each of tasks B, C and D are completed. As such, tasks B, C and D are predecessor tasks for task E.

A task management application such as Microsoft Project 2007 is typically controlled by one person, for example, a project manager. However, it is desirable for team members to be able to access tasks assigned to them and to update projected completion dates and percent complete status for those tasks. An online collaboration program like WSS permits task lists to be stored on a server computer, for example server 204, so that users, for example a user on client 201, can access the task lists and make changes to them when appropriate. Any changes made by the project manager or by team members need to be synchronized between client and server and actual conflicts need to be resolved. During the synchronization between the client and server, the self-referencing predecessor IDs (i.e. fields whose data points to other items) for each task are also synchronized. Typically, however, the predecessor IDs associated with the client, however, do not match the predecessor IDs for the collaboration software on the server. In this example, the predecessor IDs are different between the client 201 and the server 204. For example, the IDs for the tasks associated with the collaboration application on the server are different from the corresponding IDs for the tasks associated with the project management application on the client.

The synchronizing application creates two predecessor lists. One predecessor list is for the IDs of the project predecessors and the other list is for the collaboration predecessors. During the comparison and modification stage of the synchronization these lists may be cleared and overwritten on an item by item basis. During the write stage of the synchronization these lists are examined to determine what data to write (i.e. project task data or collaboration task data). When the synchronization application is currently writing project data then the project predecessor list is written unless it is clear, in which case the collaboration predecessor list is mapped to project IDs and then written. When the synchronization application is currently writing collaboration data then the collaboration predecessor list is written unless it is clear, in which case the project predecessor list is mapped to project IDs and then written. Maintaining two lists assists in performing a single-pass synchronization between the client 201 and the server 204.

According to one embodiment, as discussed above the project management application 220 on client 201 and the collaboration application 210 on server 204 use IDs to define predecessors for tasks within a project. For example, a project for project management application 220 may have two tasks with IDs 4 and 5 and task 5 might be a predecessor of task 4. Likewise the corresponding project stored with the collaboration application 210 may store tasks 4 and 5 as tasks 14 and 15. In order to associate the related tasks between the project management application 220 and the collaboration application 210, a mapping is maintained between the project task IDs and the collaboration task IDs. For example, on client 201, task 5 that is associated with the project management application 220 maps to a field that indicates that it is synced to task 14 of the collaboration application. A similar mapping exists on server 204.

During the sync operation between the client 201 and server 204, the project tasks and collaboration tasks are read into separate data structures such that the synchronization application 212 can compare and modify data without affecting the underlying data. These data structures include the two predecessor lists discussed above (a project predecessor list containing project IDs and a collaboration predecessor list containing collaboration IDs). During the "read phase" of the sync operation, predecessors that are associated with the project management application 220 and the collaboration application 210 are read into their respective lists. For instance, project tasks initially have the project predecessor list filled out and the collaboration tasks initially have the collaboration predecessors list filled out.

During a compare phase of the synchronization a determination is made as to what tasks are merged and potentially overwritten. For an exemplary compare phase see FIGS. 7 and 8 and the related discussion. Other compare algorithms may also be utilized. To accommodate predecessors, whenever a project task "wins" during the compare phase (i.e. is going to overwrite data in the collaboration task) the collaboration task's collaboration predecessor list is cleared and the project predecessor list is populated with the corresponding project IDs. When a collaboration task "wins" during the compare phase (i.e. is going to overwrite data in the project task) the project task's project predecessor list is cleared and the collaboration predecessor list is populated with the corresponding collaboration IDs.

During the write phase these two predecessors lists are used to determine how to write the predecessor information. If a project task is being written and the project predecessor list is not empty, that predecessor list is used because the project item "won" during the compare phase of the synchronization. If however, the project predecessor list is empty and the collaboration predecessor list is not empty then the collaboration predecessor list IDs are used since the project task "lost" during the compare phase. As discussed above, a mapping between project task IDs and collaboration task IDs is used to map IDs from the client 201 to the server 204 and IDs from the server 204 to the client 201. For example, from a collaboration ID the project ID can be determined since either the item has already been synced (and thus, already has a corresponding project ID) or the task has just been created in the project for the project management application 220 so the correct project ID is based on the collaboration ID. When a task is deleted during the synchronization, then during the "write" phase this deletion is detected and if an item has a predecessor to an item that has been deleted that predecessor isn't written. According to another embodiment, instead of clearing the list that "loses" during the compare phase, the predecessor lists may be merged, in which case both lists are used.

Figure 3:
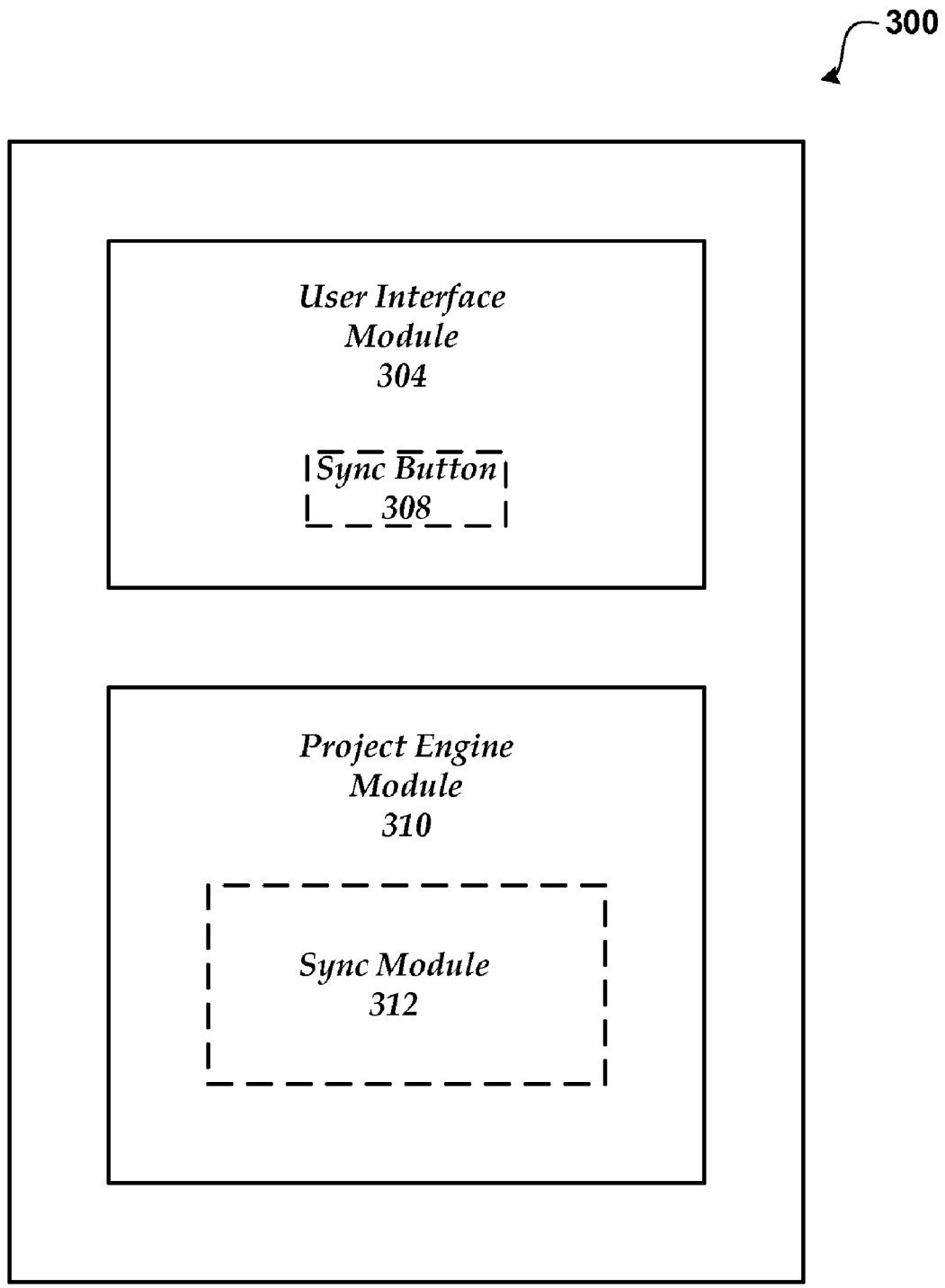
FIG. 3 shows an example client computer that runs a task management application software in a project management system.

FIG. 3 shows an example client computer 300 that runs a task management application software in a project management system such as Microsoft Project 2007. Example client computer 300 includes an example user interface module 304 and an example project engine module 310. Included within the example project engine module 310 is sync module 312.

The example user interface module 304 permits a user to enter project entities like tasks, resources and assignments into the project management system. The entities are typically stored in tables, so that there typically would be a table for tasks, a table for resources and a table for assignments. Associated with a project task are one or more attributes related to the task. The attributes correspond to columns in the task table. Some example attributes are the name, owner, start date, completion date, project duration and status of a task. Each task also has a unique project identifier to identify the task.

A user may choose attributes from a plurality of attributes made available in the example project management system. The example user interface module 304 permits the user to select one or more of these or available attributes and associate the attributes with a task. The example user interface module 304 also permits the user to select one or more attributes made available on the server computer for each task. Server attributes typically include the name, owner, start date, completion date, project duration and status of a task.

The result is a set of client and server attributes associated with each task that are monitored by the task management system.

The example project engine module 310 provides a software engine that runs the project management system. One or more tasks may be linked to other tasks in a parent/child relationship. One or more tasks may have a predecessor or successor relationship with other tasks. When a start date or task duration changes for a task, the example project engine module 310 calculates the resulting start dates and end dates of all linked tasks and updates the dates for those tasks in the project management system.

The example sync module 312 controls the synchronization of tasks between the client computer, e.g. client 201 and the server computer 204 illustrated in FIG. 2. The sync module 312 may also include changelists and bitmasks for each task. A changelist is a list of attributes for each task that may be synchronized between the client computer 201 and the server computer 204. The changelist corresponds to the client 201 and server 204 attributes for the task selected by the user via user interface module 304. A bitmask is a data structure that includes a bit for each attribute in the changelist. For example, a bit may be set in the bitmask when the corresponding attribute changes on the client computer 201. The sync module 312 may use the bitmasks to determine which attributes have changed on the client computer 201 so that these attributes can be synchronized with corresponding attributes on the server computer 204.

Referring now to FIGS. 4-7, an illustrative process for synchronizing self-referencing fields between a project application and a collaboration application is described.

Figure 4:
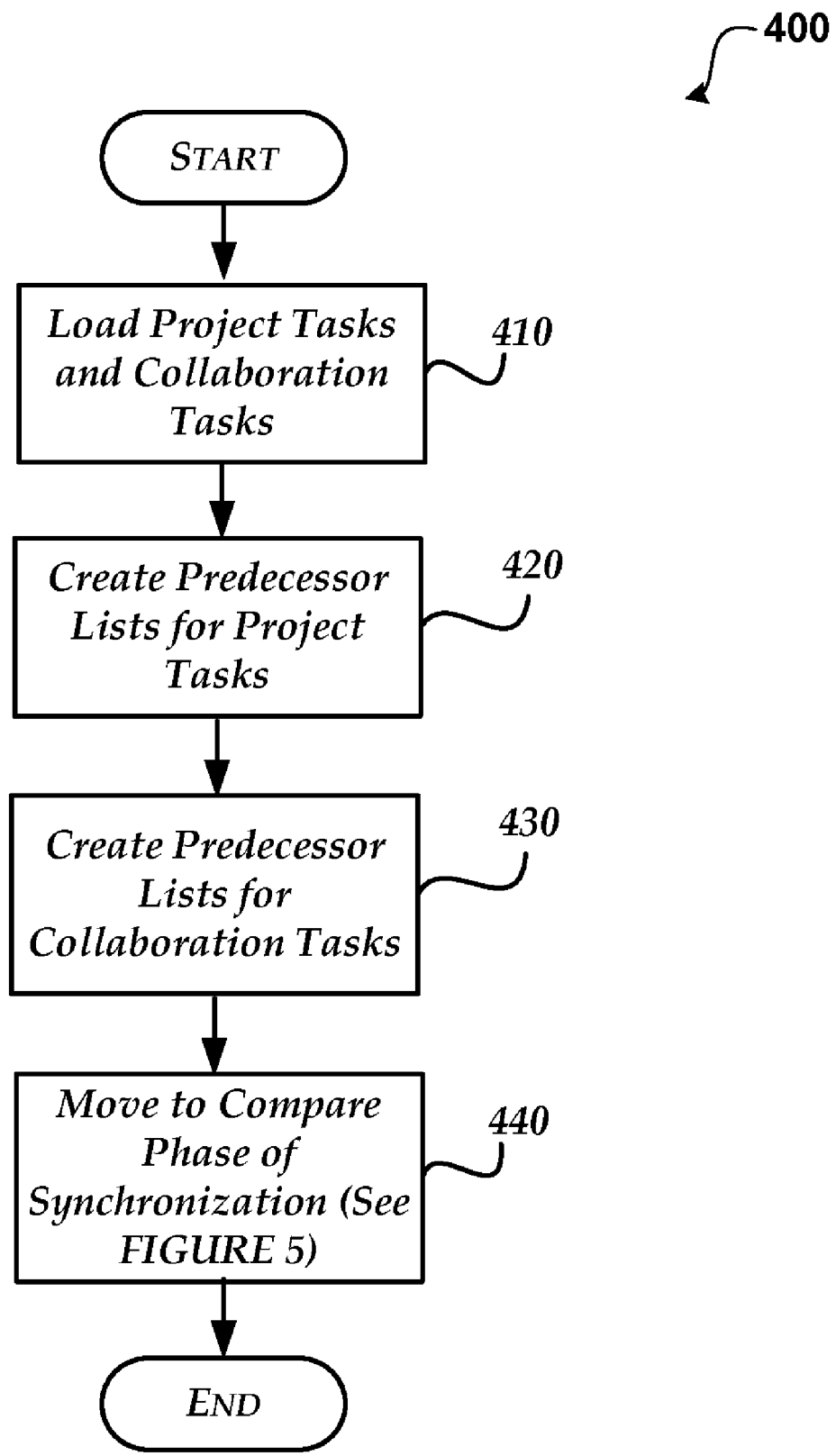
FIG. 4 shows a process during a read phase of a synchronization for synchronizing self-referencing fields.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof FIG. 4 shows a process during a read phase of a synchronization for synchronizing self-referencing fields.

After a start operation, the process flows to operation 410 where the project tasks and the collaboration tasks are loaded. For example, the project tasks from the project management application are loaded from the client and the collaboration tasks from the collaboration application are loaded from the server.

Moving to operation 420, two predecessor lists are created for the tasks. According to one embodiment, for each project task a project predecessor list includes the project IDs for the task's predecessors and an initially empty collaboration predecessor list that includes the collaboration IDs for the task's predecessors.

Moving to operation 430, two predecessor lists are created for the collaboration tasks. According to one embodiment, the server creates a collaboration predecessor list that includes the collaboration IDs for the task's predecessors and an initially empty project predecessor list that includes the project IDs for the task's predecessors.

Flowing to operation 440, the synchronization moves to a compare phase of the synchronization at which point a determination is made as to what data to write (e.g. the project task data or the server task data).

The process then flows to an end operation and returns to processing other actions.

Figure 5:
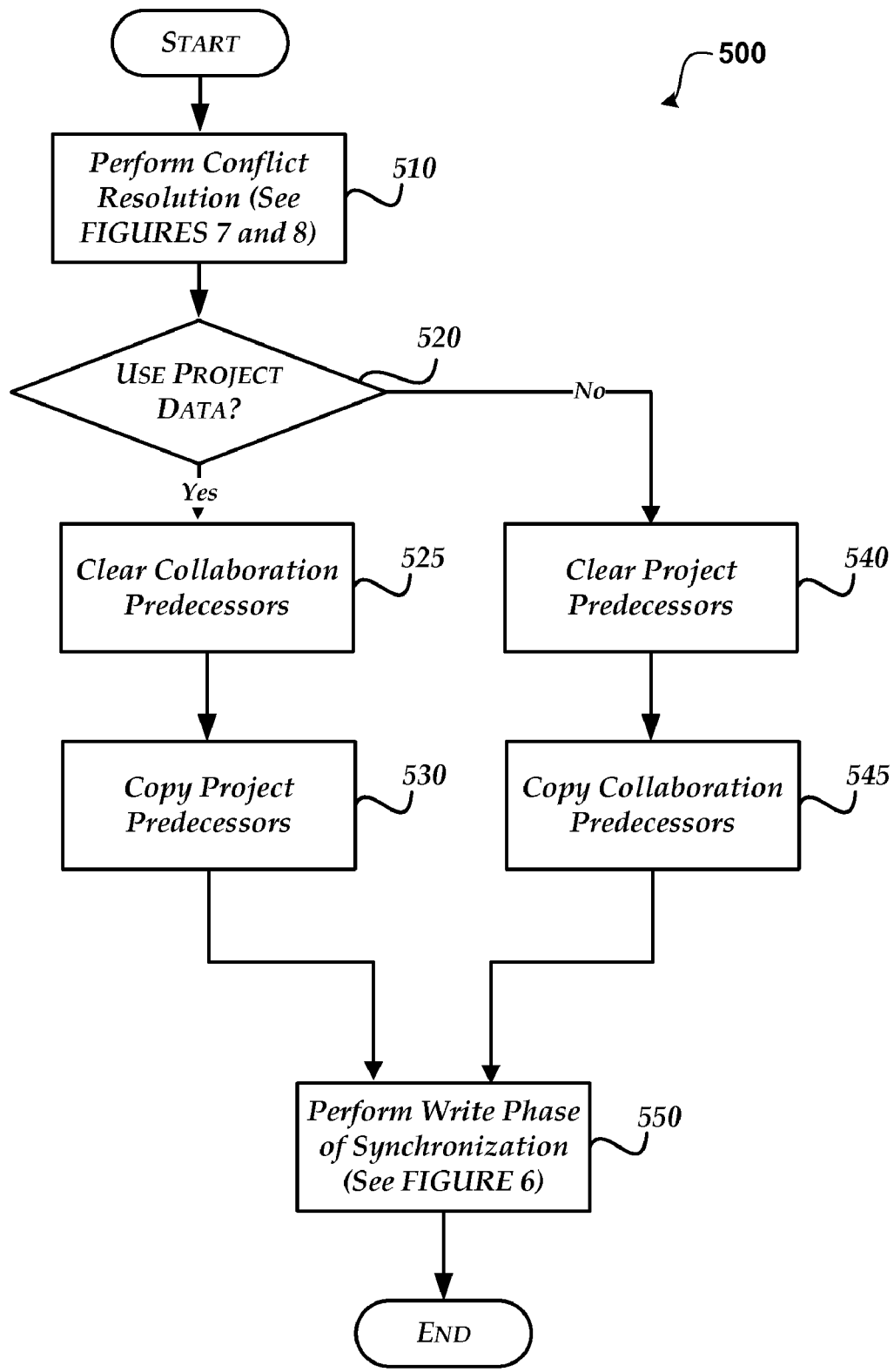
FIG. 5 illustrates a process for adjusting predecessor lists based on a compare phase of a synchronization operation.

FIG. 5 illustrates a process 500 for adjusting predecessor lists based on a compare phase of a synchronization operation.

Figure 7:
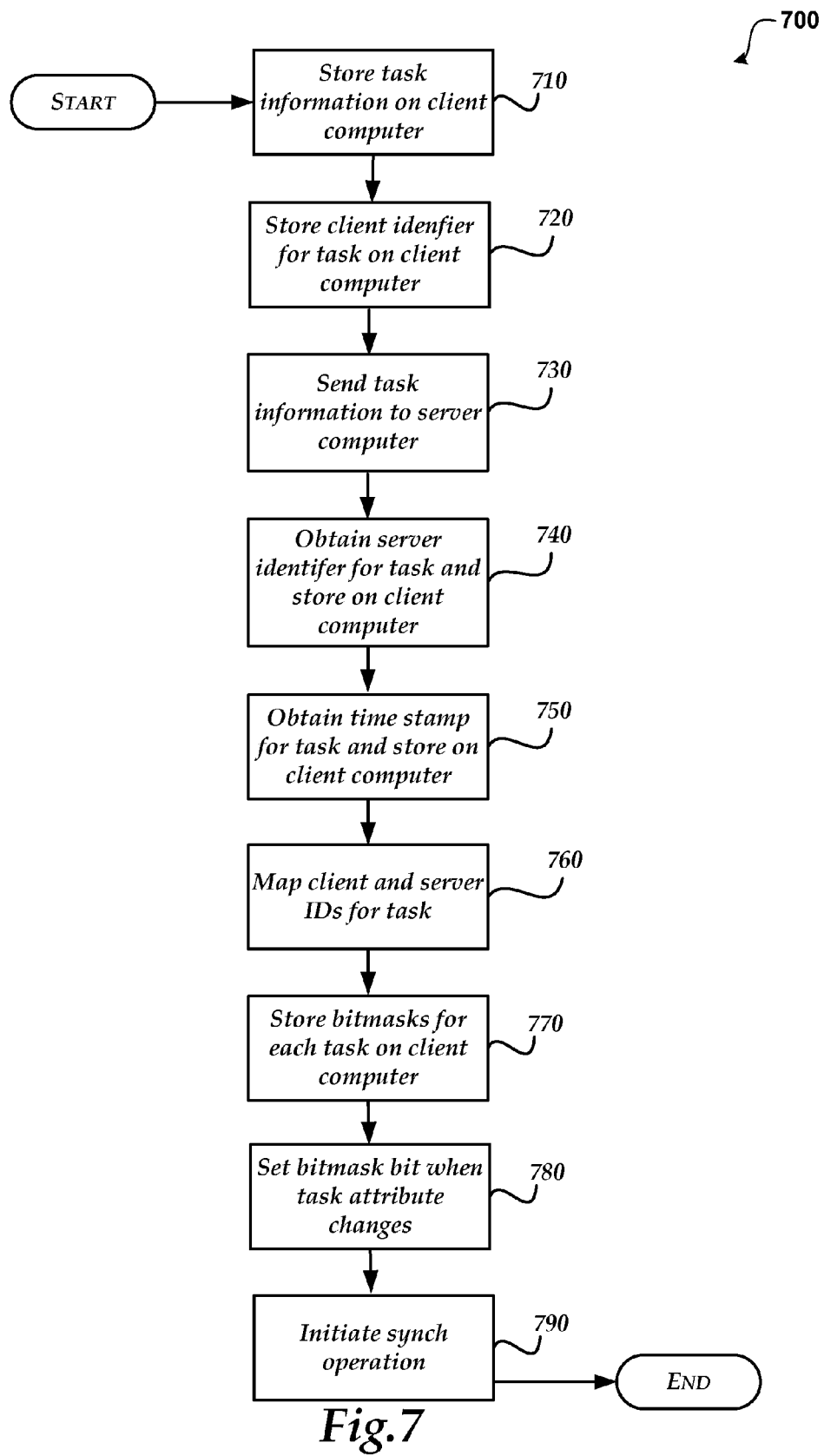
FIG. 7 shows a process 700 for resolving conflicts between interrelated data on a client computer and a server computer.
Figure 8:
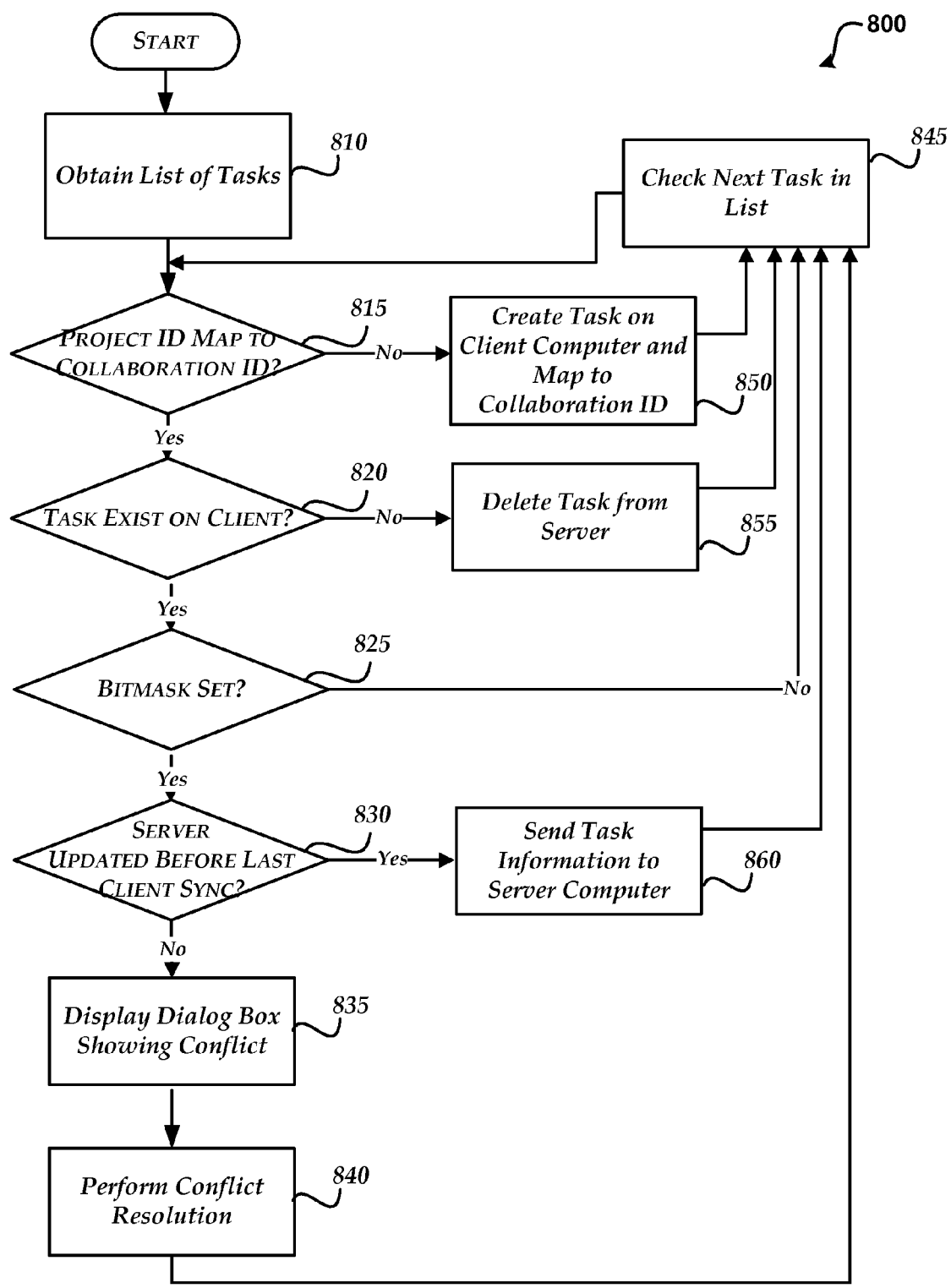
FIG. 8 is a flowchart of an example sync operation including conflict resolution.

After a start operation, the process flows to operation 510 where a determination is made as to what task data is to be synchronized (i.e. what task "won") by performing a conflict resolution (See FIGS. 7 and 8 and related discussion for an exemplary process)

Flowing to decision operation 520, a determination is made as to whether to use the project data for a task or to use the collaboration task data for a task.

When the project task data is to be used, the process moves to operation 525 where the collaboration predecessor list is cleared. Moving to operation 530, the project predecessor IDs are copied into the project predecessor list.

When the collaboration task data is to be used, the process moves to operation 540 where the project predecessor list is cleared. Moving to operation 545, the collaboration predecessor IDs are copied into the project predecessor list.

Figure 6:
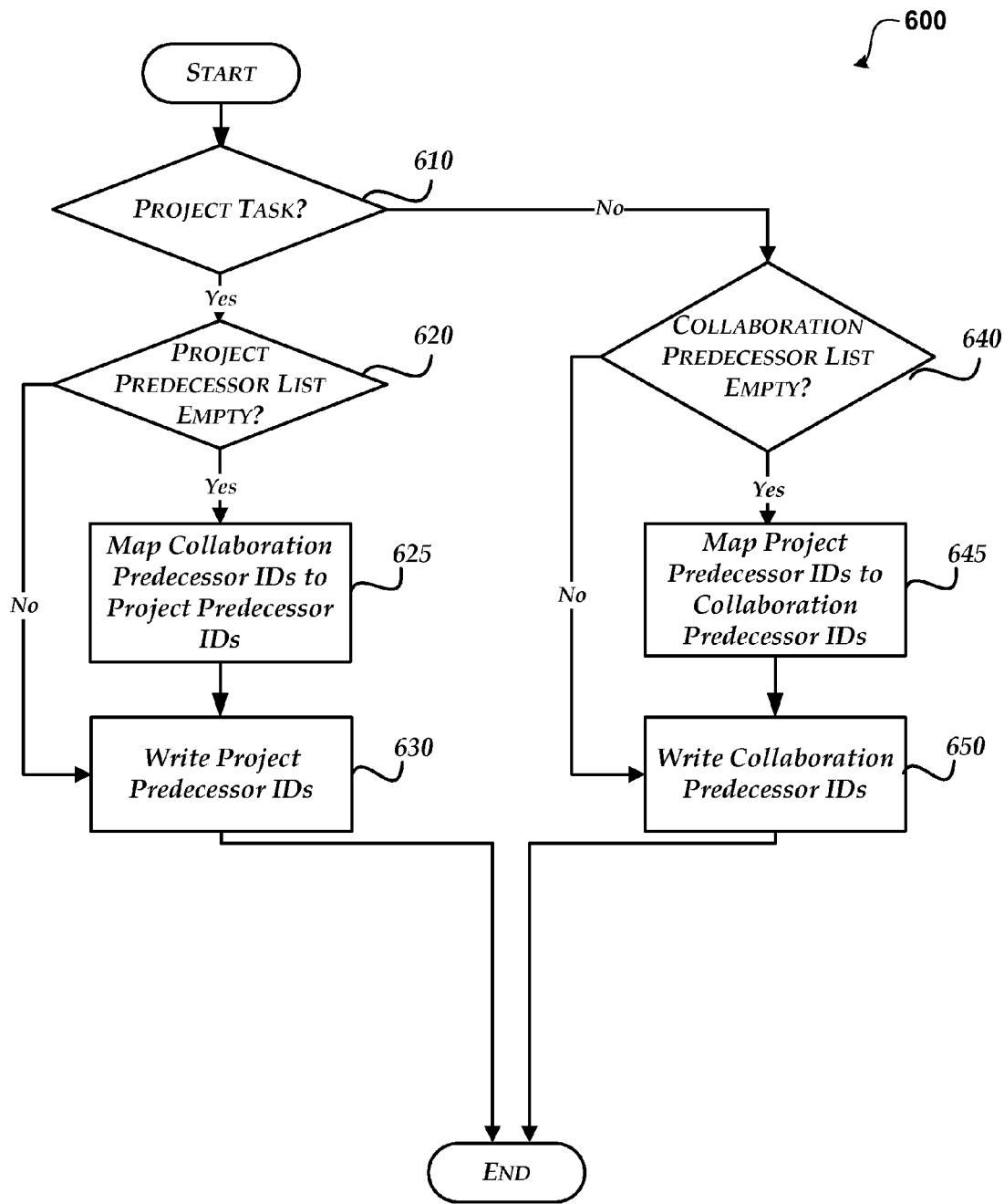
FIG. 6 illustrates a process for synchronizing self-referencing fields during a write phase of a synchronization operation.

Moving to operation 550, the process moves to the write phase of the synchronization (See FIG. 6 and related discussion).

The process then flows to an end operation and returns to processing other actions.

FIG. 6 illustrates a process 600 for synchronizing self-referencing fields during a write phase of a synchronization operation.

After a start operation, the process flows to decision operation 610, where a determination is made as to whether a project task on the client is being synchronized.

When a project task is being synchronized on the client then the operation moves to decision operation 620 where a determination is made as to whether the project predecessor list is empty.

When the project predecessor list is empty, the process flows to operation 625 where the collaboration predecessor IDs are mapped to the project predecessor IDs. The process then moves to operation 630 where the project predecessor IDs are written.

When the predecessor list is not empty the process moves to operation 630 where the project predecessor IDs are written.

Similarly, when a collaboration task is being synchronized on the server then the operation moves to decision operation 640 where a determination is made as to whether the collaboration predecessor list is empty.

When the collaboration predecessor list is empty the process flows to operation 645 where the project predecessor IDs are mapped to the collaboration predecessor IDs. The process then moves to operation 650 where the collaboration predecessor IDs are written.

When the collaboration predecessor list is not empty the process moves to operation 650 where the collaboration predecessor IDs are written.

The process then flows to an end operation and returns to processing other actions.

FIG. 7 shows a process 700 for resolving conflicts between interrelated data on a client computer and a server computer.

After a start operation, the process moves to operation 710 where task information is stored on the client computer. The task information may be entered via a client computer application program, typically a project management application program, and includes one or more tasks and one or more attributes associated with each task. Attributes include information such as the name of the task, the start and completion dates of the task, the duration of the task, the priority of the task, etc. Each task has associated with it a unique client computer task management application identifier. The unique client computer task management application identifier is stored on the client at operation 720.

Flowing to operation 730, the task information is sent to the server computer, typically by publishing it to a document sharing and collaboration program running on the server computer. When the task information is stored on the server computer, the server computer assigns a unique server computer application identifier for each task.

Moving to operation 740, the unique server computer application identifier is obtained for each task and stored on the client computer.

When a task is stored on the server computer, a timestamp is also stored, indicating the date and time that the task was last modified on the server computer. At operation 750, the timestamp for the task is obtained from the server computer and stored on the client computer.

Flowing to operation 760, the unique server computer application identifier for each task is mapped to the unique client computer task management application identifier for the task and the mappings are stored on the client computer.

When each task is created on the client computer, a changelist is also created. The changelist identifies attributes for the task that are to be synced with the server. A bitmask is created for each changelist, with each bit in a bitmask corresponding to an attribute to be synced. At operation 770 the bitmasks for each task are stored on the client computer. When a task is edited via the client computer task management application, one or more attributes are changed. At operation 780, a bit is set in the bitmask for the task for each attribute that is changed.

Periodically, particularly when tasks are edited on the client computer, the client computer initiates a sync operation to sync these changes with the server. The sync operation is initiated at operation 790.

FIG. 8 is a flowchart of an example sync operation including conflict resolution.

After a start operation, the process flows to operation 810 where a list of tasks and attributes are obtained from the server computer. At decision operation 815, for each of the tasks obtained from the server computer, a determination is made as to whether the unique server computer application identifier (collaboration ID) for the task is mapped to the unique client computer task management application identifier (project ID) for the task. For example, a determination is made whether the Project ID for the task is mapped to the collaboration ID for the task. If a task does not map, at operation 850 a new task is created on the client computer and mapped to unique server computer application identifier for the task.

If a task does map, at operation 820, a determination is made as whether the task exists on the client computer. If a task maps but does not exist on the client computer, it is an indication that the task was deleted from the client computer. Therefore, at operation 855, the task is deleted from the server computer so that the server computer is consistent with the client computer.

If the task both maps and exists on the client computer, a determination is made at decision operation 825 whether any bits in the bitmask for the task are set. If any of the bits in the bitmask for the task are set, indicating that at least one attribute for the task has been changed, a determination is made at decision operation 830 as to whether the server computer was updated before the last client computer sync. This determination is made by checking the date and time that the task was last modified on the server computer with the date and time that the client computer last initiated a sync operation. If the date and time that the task was last modified on the server computer is earlier than the date and time than the task was last modified on the client computer, indicating that the task was updated on the client computer and the server computer does not yet have this updated information, the updated task information is sent to the client computer at operation 860.

If a bitmask bit is set for the task and the server computer was updated after the last client sync, the client computer flags as conflicts all fields in which the bitmask bits are set and at operation 835 displays a dialog box to the user showing the conflict. At operation 840, the user manually performs conflict resolution by choosing one of the conflicting attributes. According to one embodiment, this is done via a dialog box that displays the conflict.

When conflict resolution is computed for a task or when operations 850, 855 or 860 have been completed if there is no conflict, control passes to operation 845 to check the next task and proceed with operation 815 again, as discussed. Any transitive changes are automatically updated by the task management application, minimizing the conflicts presented to the user for resolution.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for synchronizing self-referencing fields between a project management application and a collaboration application, the method executing on a processor of a computer, comprising:
    loading project tasks for a project on a client computing device;
    loading collaboration tasks for the project on a server computing device that correspond to the project tasks on the client computing device such that a change to any one of the collaboration tasks is reflected in the corresponding project tasks after synchronization;
    associating each of the collaboration tasks with a corresponding project task;
    creating a project predecessor list for each project task;
    creating a collaboration predecessor list for each collaboration task;
    for each project task and corresponding collaboration task determining when to use project task data and when to use the collaboration task data by performing a conflict resolution; and
    accessing the project predecessor list and the collaboration predecessor list to determine when to select the project predecessor list and when to select the collaboration predecessor list for writing.

2. The method of claim 1, further comprising clearing the collaboration predecessor list when the project task data is to be used.

3. The method of claim 2, further comprising clearing the project predecessor list when the collaboration task data is to be used.

4. The method of claim 3, further comprising writing the project predecessor list when the collaboration predecessor list is cleared and writing the collaboration predecessor list when the project predecessor list is cleared.

5. The method of claim 2, further comprising copying the project predecessor identifiers when the collaboration predecessor list is cleared and copying the collaboration predecessor identifiers when the project predecessor list is cleared.

6. The method of claim 3, further comprising performing a mapping between the collaboration predecessor identifiers and the project predecessor identifiers.

7. The method of claim 6, further comprising determining the mapping based on which list is cleared.

8. A computer-readable memory having computer-executable instructions for synchronizing self-referencing identifiers that are associated with tasks of a task management application on a client computing device and a collaboration application on a server computing device, comprising:
    initiating a synchronization session to synchronize project data for a project including tasks between a client and a server;
    associating tasks of the project between the client and the server such that each of the tasks for the project that is stored on the server for the project is associated with a corresponding task obtained from the client for the project;
    loading tasks for the project and for each task creating a project predecessor list and a collaboration predecessor list; wherein the project predecessor list comprises at least one project predecessor identifier when the project task has a predecessor and wherein the collaboration predecessor list comprises at least one collaboration predecessor identifier when the collaboration task has a predecessor;
    determining when to use project task data and when to use collaboration task data when synchronizing each task; and
    during a write phase of the synchronization, writing the project predecessor list when project task data is used and writing the collaboration predecessor list when collaboration task data is to be used.

9. The computer-readable memory of claim 8, wherein loading tasks for the project comprises loading collaboration tasks from the server and loading project tasks from the client.

10. The computer-readable memory of claim 9, further comprising clearing the collaboration predecessor list when project task data is to be used and clearing the project predecessor list when the project task data is to be used.

11. The computer-readable memory of claim 10, further comprising mapping any identifiers in the non-cleared predecessor list to corresponding identifiers in the cleared list.

12. The computer-readable memory of claim 11, determining which predecessor list to write based on which predecessor list is cleared.

13. The computer-readable memory of claim 10, further comprising copying the project predecessor identifiers to the collaboration predecessor list after the collaboration predecessor list is cleared.

14. The computer-readable memory of claim 13, further comprising copying the collaboration predecessor identifiers to the project predecessor list after the project predecessor list is cleared.

15. The computer-readable memory of claim 14, further comprising writing the predecessor identifiers for tasks on the client and writing the predecessor identifiers on the server.

16. A system for synchronizing self-referencing fields during a single pass of a synchronization between a client and server, comprising:
    a processor and a computer-readable medium;

an operating environment stored on the computer-readable medium and executing on the processor;
a project management application operating on a client; and
a synchronization application operating on a server;
a synchronization module configured to perform tasks, comprising:
  initiating a synchronization session to synchronize project data for a project including tasks between the client and the server;
  associating the tasks of the project between the client and the server such that each of the tasks for the project that is stored on the server for the project is associated with a corresponding task obtained from the client for the project;
  loading tasks for the project and for each task creating a project predecessor list and a collaboration predecessor list; wherein the project predecessor list comprises at least one project predecessor identifier when the project task has a predecessor and wherein the collaboration predecessor list comprises at least one collaboration predecessor identifier when the collaboration task has a predecessor; wherein loading tasks for the project comprises loading collaboration tasks from the server and loading project tasks from the client;
  determining when to use project task data and when to use collaboration task data when synchronizing each task; and
  writing the project predecessor list when project task data is used and writing the collaboration predecessor list when collaboration task data is to be used.

17. The system of claim 16, further comprising clearing the collaboration predecessor list when project task data is to be used and clearing the project predecessor list when the project task data is to be used.

18. The system of claim 17, further comprising mapping any identifiers in the non-cleared predecessor list to corresponding identifiers in the cleared list.

19. The system of claim 16, determining which predecessor list to write based on which predecessor list is cleared.

20. The system of claim 19, further comprising writing the predecessor identifiers for tasks on the client and writing the predecessor identifiers on the server.

* * * * *